(12) United States Patent
Yeh et al.

(10) Patent No.: US 6,716,509 B2
(45) Date of Patent: Apr. 6, 2004

(54) OPTICAL RECORDING MEDIUM

(75) Inventors: Sue-Min Yeh, Banchiau (TW);
Kao-Ming Chang, Tainan (TW);
Wen-Pin Chiu, Shindian (TW);
Chiung-Man Huang, Banchiau (TW);
Lii-Chyuan Tsai, Hsinchu (TW)

(73) Assignee: CMC Magnetics Corporation, Taipei (TW)

( * ) Notice: Subject to any disclaimer, the term of this patent is extended or adjusted under 35 U.S.C. 154(b) by 30 days.

(21) Appl. No.: 10/223,462

(22) Filed: Aug. 20, 2002

(65) Prior Publication Data

US 2004/0043179 A1 Mar. 4, 2004

(51) Int. Cl.[7] .................................. B32B 3/02
(52) U.S. Cl. .................... 428/64.1; 428/64.8; 430/270.2
(58) Field of Search ................ 428/64.1, 64.4, 428/64.8, 913; 430/270.14, 270.2, 270.21, 495.1, 945

(56) References Cited

U.S. PATENT DOCUMENTS 5,976,658 A * 11/1999 Tomizawa
6,306,478 B1 * 10/2001 Chen
2003/0157290 A1 * 8/2003 Yeh

* cited by examiner

*Primary Examiner*—Elizabeth Mulvaney
(74) *Attorney, Agent, or Firm*—Rabin & Berdo, P.C.

(57) ABSTRACT

An optical recording medium provided on a substrate with a recording layer, said recording layer comprising at least one kind of the trimethine-cyanine dye and an additive, wherein said the additive of recording layer selectively comprises the dye selected from the group consisting of the chemical compounds represented by the following general formula [10], [11], [12], and [13]:

[10]

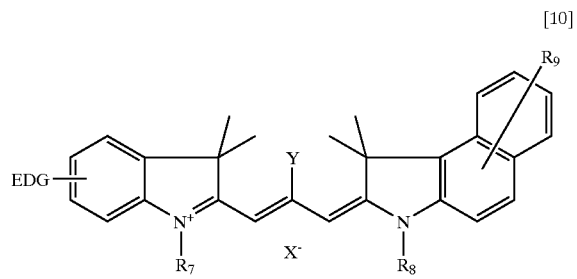

[11]

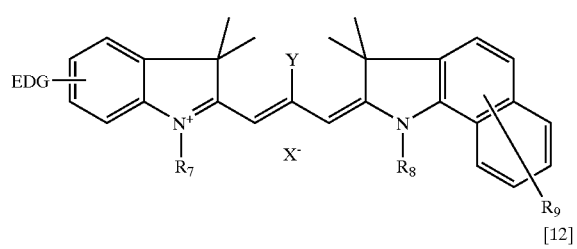

[12]

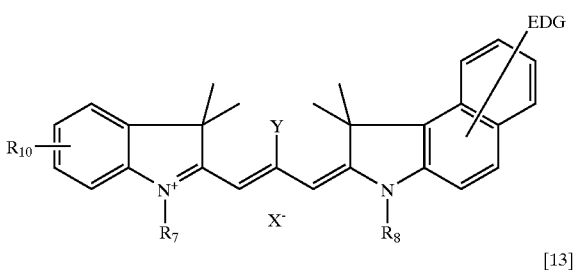

[13]

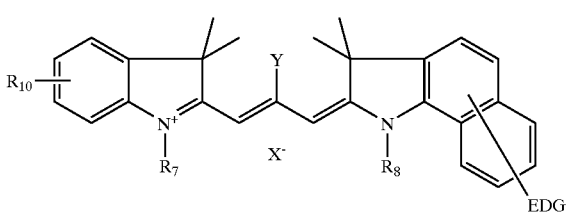

"EDG" represents any electron-withdrawing substituted group such as alkylamino or anino group.

10 Claims, No Drawings

OPTICAL RECORDING MEDIUM

BACKGROUND OF THE INVENTION

1. Field of the Invention

This invention relates to an optical recording medium, particularly to an optical recording medium for recording layer comprising at least one asymmetric trimethine-cyanine dye with specific functional group and an additive, which can enhance the writing sensitivity of DVD-R.

2. Description of the Related Art

An optical recording medium capable of once recording by a laser ray has been known. In the structure of the CD-R recording medium, a recording layer comprising an organic dye, a reflection layer and a protective layer are laminated on a transparent substrate by order. The recording information on the disc is performed by irradiating a laser at a wavelength of 780 nm to 830 nm to cause exothermic deformation of the recording layer. The information is usually reproduced by irradiating with the same laser ray, and the reflecting difference between the recorded area and unrecorded area is detected for the recording layer.

It is known that a laser ray with a shorter wavelength has a reduced light spot. Therefore, studies have being made to develop the optical disc capable of recording and reproducing by a laser beam of a wavelength of 620 nm to 690 nm to increase the recording density. Recordable digital video (DVD-R), which is capable of recording and reading in high density, is propagated as new media of the next generation. Since the wavelength zone for performing the recording and reproducing in DVD-R differs from that of the CD-R, the criteria for selecting the recording material to be employed for the CD-R cannot be applied to the DVD-R. Hence, new selection criteria are required to be established from a viewpoint peculiar to the DVD-R.

Trimethine-based cyanine dye is a popular material for the DVD-R recording layer. U.S. Pat. No. 5,976,658, and U.S. Pat. No. 6,291,045 described the use of trimethine-based cyanine dye having symmetry or asymmetry indolenine structure for DVD-R. However, the dye material should be selected carefully, while the writing wavelength of laser beam of DVD-R machines is changed from 635 nm to 650 nm (or further). Because the wavelength of laser power is getting longer, the dye absorbance of film state for 650 nm should be increased a little more. The dye, which is suitable for writing wavelength of 635 nm laser beam, is not performed well while the writing wavelength of laser beam is 650 nm because of low sensitivity at the region that might cost higher writing power to record information or record failed.

SUMMARY OF THE INVENTION

Said in U.S. Pat. No. 6,338,888, increase the sensitivity of recording could be reached by increasing the absorption of organic layer at the wavelength of writing laser. According to the opinion, we declare a new composition with specific additives which could enhance the recording sensitivity.

The first object of the present invention is to provide an asymmetric indolenine cyanine dye with electron-withdrawing group which is substituted on one ring of indolenine or benzoindolenine by the formula [1], [2], [3], [4], which are shown in scheme 1.

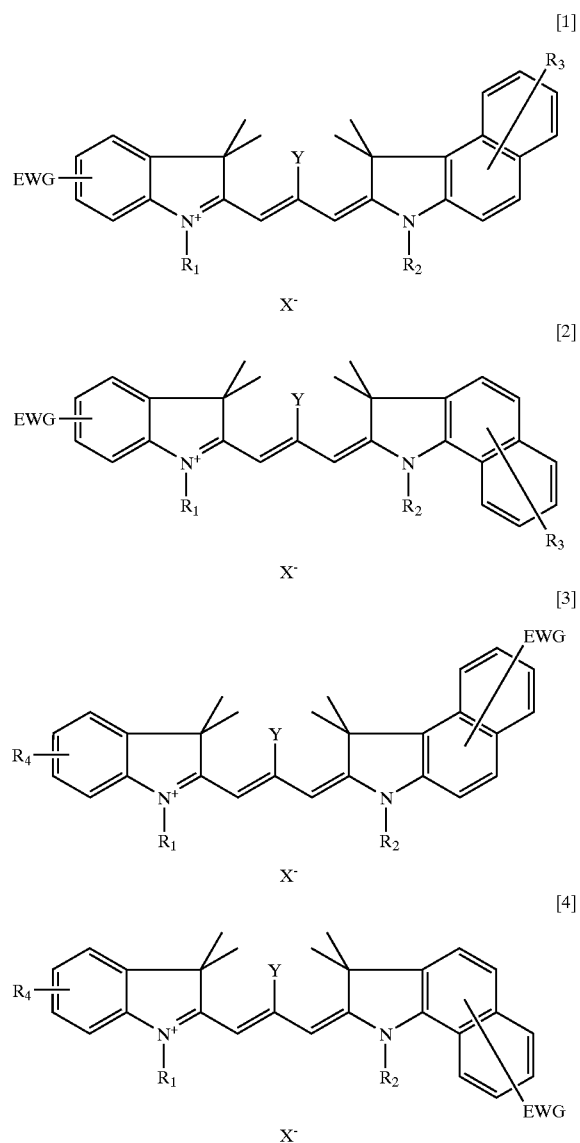

Scheme 1

The second object of the present invention is to provide an optical recording medium with a recording layer, which comprises at least one asymmetric trimethine-cyanine dye with electron-withdrawing substituted group (EWG) and an additive which is a kind of asymmetric trimethine-cyanine dye with electron-donating substituted group (EDG).

The third object of the present invention is to provide a process to prepare asymmetric trimethine-cyanine dye with electron-withdrawing group and the one with electron-donating substituted group (EDG).

The fourth object of the present invention is to provide an optical recording medium with improved write/read characteristics at the writing wavelength of 650 nm or further.

According to the invention, the asymmetric trimethine-cyanine dye with electron-withdrawing substituted group used in the recording layer is any one represented by the general formulas [1], [2], [3], and [4] which were shown in scheme 1. "EWG" represents any electron-withdrawing substituted group, such as cyano and nitro group. "$R_3$" and "$R_2$" are independently selected from substituted or unsubstitued alkyl, phenyl, benzyl, alkylphenyl and phenoxyalkyl group. "$R_3$" and "$R_4$" are independently selected from hydrogen atom, halogen atom, alkoxy, hydroxyl or alkyl group. "Y" is selected from hydrogen atom, halogen atom or alkyl group, and "X" is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, $SCN^-$, alkylsulfonate and alkylcarboxylate. The material has a maximum absorption wavelength from 575 nm to 600 nm. It is used as a recording material for DVD-R machine with the laser wavelength from 620 nm to 690 nm.

The material used in the recording layer also selectively comprises the trimethine-cyanine dye of the following general formula [5]:

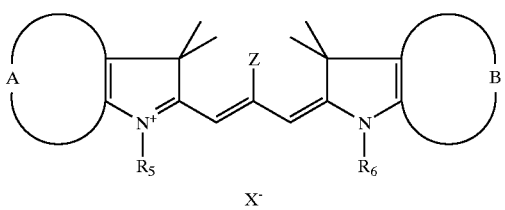

[5]

"A" and "B", may be the same or different from each other, represent any one of the following general formulas [6], [7], [8], and [9]:

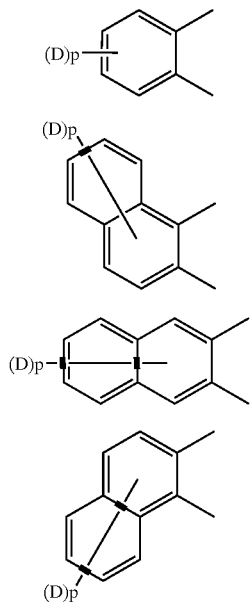

"D" may be any one of the substituted or unsubstitued alkyl, carboxyl, alkoxycarbonyl, alkylcarboxyl, alkoxyl, alklhydroxyl, aralkyl, alkenyl, alkylamide, alkylamino, alkylsufonamide, alkylcarbamoyl, alkylsulfamoyl, hydroxyl, halogen atom, hydrogen atom, alkylalkoxyl, alkylhalide, alkylsulfonyl, alkylcarboxyl or alkylsulfonyl which are bonded to a metallic ion or alkyl, phenyl, benzyl, alkylphenyl or phenoxyalkyl group. "p" represents the number of substituent groups, which is an integer of 1 or more.

"$R_5$" and "$R_6$" may be the same or different from each other and are individually substituted or unsubstitued alkyl, phenyl, benzyl, alkylphenyl or phenoxyalkyl group. "Z" is hydrogen atom, halogen atom or alkyl group, and "X" is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, $SCN^-$, alkylsulfonate, and akylcarboxylate.

The material as an additive used in the dye layer also selectively comprises any trimethine-cyanine dye represented by the following general formulas [10], [11], [12], and [13]:

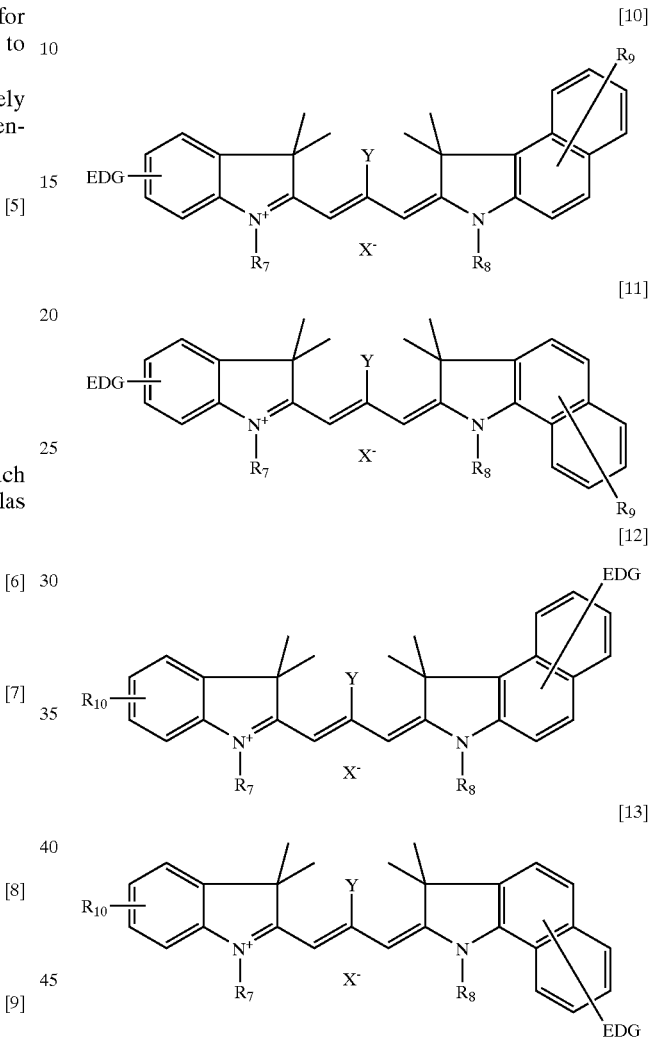

"EDG" represents any electron-donating substituted group such as amino, alkylamino, and methoxy group. "$R_7$" and "$R_8$" are the same or different from each other and are individually substituted or unsubstitued alkyl, phenyl, benzyl, alkylphenyl and phenoxyalkyl group. "$R_9$" and "$R_{10}$" are independently selected from hydrogen atom, halogen atom, cyano or nitro group. "Y" is hydrogen atom, halogen atom or alkyl group, and "X" is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, $SCN^-$, alkylsulfonate and alkylcarboxylate. The material has a maximum absorption wavelength from 575 nm to 620 nm. It is used as a recording material for DVD-R machine with the laser wavelength from 620 nm to 690 nm. The dye layer comprising not only the trimethine-cyanine dye containing "EWG" but also the trimethine-cyanine dye containing "EDG" has the advantage of increasing the recording sensitivity, so that the writing power of laser can be reduced while recording information in DVD-R.

The method of preparing dye solution according to this invention can be described as follows.

(1) A cyanine dye represented by general formula [1], [2], [3], or [4] was dissolved in an organic solvent, such as fluorinated alcohol, diaceton alcohol, methylethyl ketone, methanol, toluene, cyclohexanone, acetylacetone, and dioxane. The concentration of the dye solution was 0.5% to 20% by weight.

(2) A dye mixture, which contains cyanine dye represented by general formula [1], [2], [3], or [4] mixed with the dye of formula [5] that is less than 100% by weight, was dissolved in an organic solvent such as fluorinated alcohol, diaceton alcohol, methylethyl ketone, methanol, toluene, cyclohexanone, acetylacetone, and dioxane. The concentration of the dye solution was 0.5% to 20% by weight.

(3) A dye mixture, which contains cyanine dye represented by general formula [1], [2], [3], or [4] mixed with the dye of formula [10], [11], [12] or [13] that is less than 50% by weight, was dissolved in an organic solvent such as fluorinated alcohol, diaceton alcohol, methylethyl ketone, methanol, toluene, cyclohexanone, acetylacetone, and dioxane. The concentration of the dye solution was 0.5% to 20% by weight.

(4) A dye mixture, which contains cyanine dye represented by general formula [5] mixed with the dye of formula [10], [11], [12] or [13] that is less than 50% by weight, was dissolved in an organic solvent, such as fluorinated alcohol, diaceton alcohol, methylethyl ketone, methanol, toluene, cyclohexanone, acetylacetone, and dioxane. The concentration of the dye solution was 0.5% to 20% by weight.

(5) A dye mixture, which contains cyanine dye represented by [1], [2], [3], [4] mixed with the dye of formula [5] that is less than 100% and the dye of formula [10], [11], [12] or [13] that is less than 50% by weight, was dissolved in an organic solvent such as fluorinated alcohol, diaceton alcohol, methylethyl ketone, methanol, toluene, cyclohexanone, acetylacetone, and dioxane. The concentration of the dye solution was 0.5% to 20% by weight.

The manufacture of the optical recording medium according to this invention can be performed as follows.

(1) The material for the substrate may be employed by glass, epoxy resin, methacrylate resin, polycarbonate, polyester resin, polyvinyl chloride resin, polyolefin resin. The substrate may be provided with tracking grooves or pits.

(2) The dye solution is provided on a substrate by means of a spin-coating method.

(3) The optical recording medium may further include a reflection layer in addition to the recording layer. The reflection layer, a film of high reflectivity, can be formed by the vapor-deposition or sputtering a metal, such as Gold, Aluminum, Silver, Cupper, Platinum, alloy or multi-reflective layer.

(4) The reflection layer may be provided with protective layer. It is formed for the purpose of protecting or improving the optical recording medium, and can be formed by coating a solution of a radiation cure type resin on a given surface and then by radiation-curing the coater layer.

(5) The optical recording medium may be a single-sided recording medium obtained by laminating a single-side substrate and a non-grooved substrate with an adhesion. The single-sided optical recording medium being prepared by process (1) to (5).

(6) The optical recording medium may be a double-sided recording medium obtained by laminating two single-sided optical recording medium with an adhesion. The single-sided optical recording medium being prepared by process (1) to (5).

Other objects, features, and advantages of the invention will become apparent from the following detailed description of the preferred but non-limiting embodiment. The following description is made with reference to the accompanying drawings.

DETAILED DESCRIPTION OF THE INVENTION

The invention will be further explained in detail with reference to the following preferred embodiments.

Asymmetric dyes, which are trimethine-cyanine dyes substituted with different structure comprising electron-withdrawing group (EWG), could be synthesized by different methods suggested in *J. Org. Chem.* 1995, 60, 2411 and U.S. Pat. No. 6,306,478. For example, "EWG" is a nitro group, while "$R_3$" and "Y" are hydrogen groups in the formula [1]. A modified method is designed as shown in scheme 2, wherein the reactive condition is under atmosphere and yield of formula [1] is high.

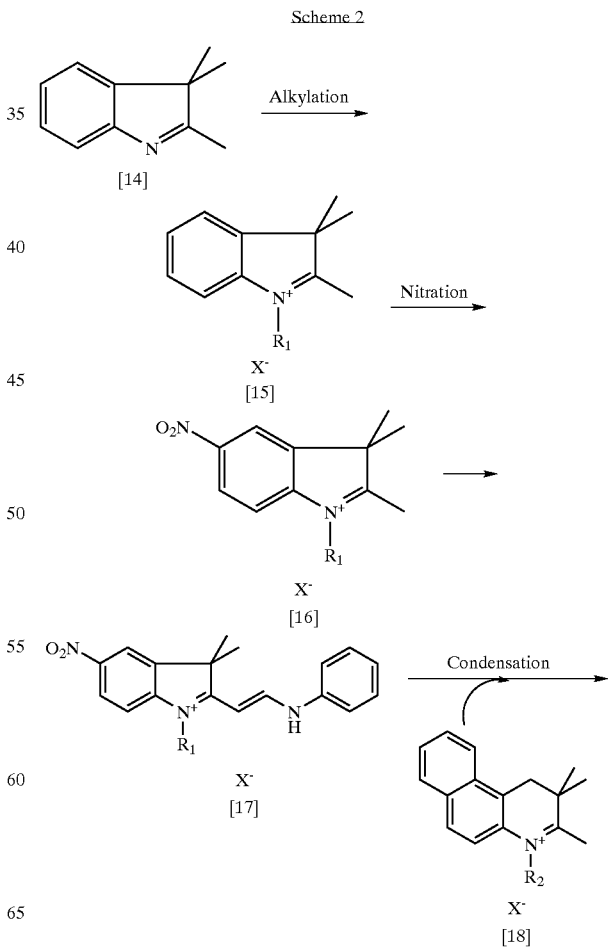

Scheme 2

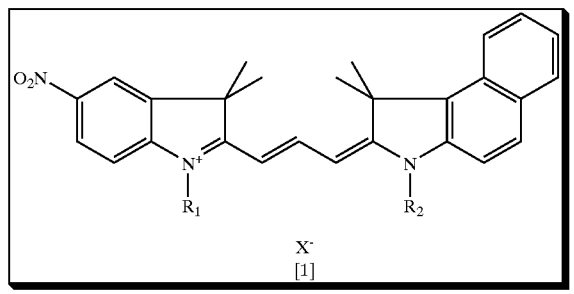

In the reaction of scheme 2, high yield of formula [15] and formula [16] could be easily achieved by using well-known alkylation and nitration processes, respectively. Then, formula [16] is dissolved in alcohol solvent and is mixed with N,N-diphenylformamidine under refluxing. Next, formula [17] is obtained with ideal quality and yield. Finally, formula [17] and formula [18] are treated with the basic solvent and stirred at room temperature; consequently, formula [1] is obtained in high yield.

Examples of the compounds of the formulas of [1], [2], [3], and [4], which are synthesized by the similar method in scheme 2, are listed in Tables 1.

TABLE 1

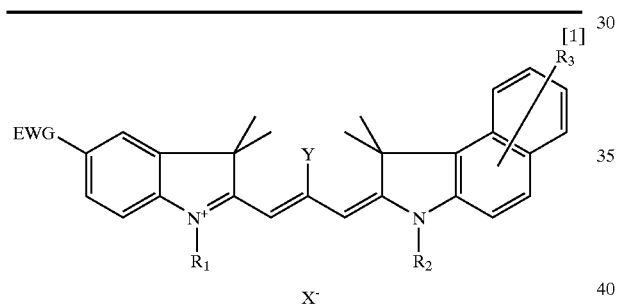

| Compound No | EWG | $R_1$ | $R_2$ | $R_3$ | X | Y |
|---|---|---|---|---|---|---|
| 1-1 | CN | $CH_3$ | $CH_3$ | H | $ClO_4$ | H |
| 1-2 | CN | $C_2H_5$ | $CH_3$ | H | $ClO_4$ | H |
| 1-3 | CN | $C_3H_7$ | $CH_3$ | H | $ClO_4$ | H |
| 1-4 | CN | $C_4H_9$ | $CH_3$ | H | $ClO_4$ | H |
| 1-5 | CN | $C_8H_{17}$ | $CH_3$ | H | $ClO_4$ | H |
| 1-6 | CN | $CH_3$ | $CH_3$ | H | $PF_6$ | H |
| 1-7 | CN | $C_2H_5$ | $CH_3$ | H | $PF_6$ | H |
| 1-8 | CN | $C_3H_7$ | $CH_3$ | H | $PF_6$ | H |
| 1-9 | CN | $C_4H_9$ | $CH_3$ | H | $PF_6$ | H |
| 1-10 | CN | $C_8H_{17}$ | $CH_3$ | H | $SbF_6$ | H |
| 1-11 | CN | $CH_3$ | $CH_3$ | H | $SbF_6$ | H |
| 1-12 | CN | $C_2H_5$ | $CH_3$ | H | $SbF_6$ | H |
| 1-13 | CN | $C_3H_7$ | $CH_3$ | H | $SbF_6$ | H |
| 1-14 | CN | $C_4H_9$ | $CH_3$ | H | $SbF_6$ | H |
| 1-15 | CN | $C_8H_{17}$ | $C_4H_9$ | H | $SbF_6$ | Me |
| 1-16 | CN | $C_8H_{17}$ | $C_4H_9$ | H | $SbF_6$ | Et |
| 1-17 | $NO_2$ | $CH_3$ | $CH_3$ | H | $ClO_4$ | H |
| 1-18 | $NO_2$ | $C_2H_5$ | $C_2H_5$ | H | $ClO_4$ | H |
| 1-19 | $NO_2$ | $C_3H_7$ | $C_4H_9$ | H | $ClO_4$ | H |
| 1-20 | $NO_2$ | $C_4H_9$ | $CH_3$ | H | $ClO_4$ | H |
| 1-21 | $NO_2$ | $C_3H_7$ | $C_4H_9$ | H | $PF_6$ | H |
| 1-22 | $NO_2$ | $C_3H_7$ | $C_4H_9$ | H | $SbF_6$ | H |
| 1-23 | $NO_2$ | $C_3H_7$ | $C_4H_9$ | H | $BF_4$ | H |
| 1-24 | $NO_2$ | $C_3H_7$ | $C_4H_9$ | H | $CH_3SO_3$ | H |

The material used in the dye layer also selectively comprises the trimethine-cyanine dye of the following general formula [5]:

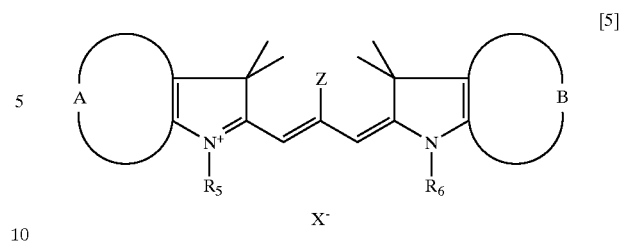

"A" and "B" represent any one of the following formulas [6], [7], [8], and [9]:

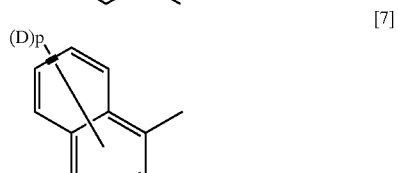

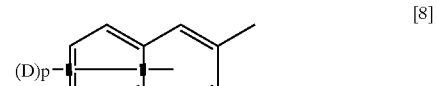

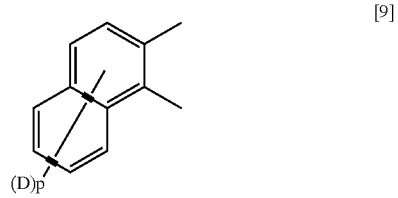

"A" and "B" may be the same or different from each other. "D" may be any one of the substituted or unsubstitued alkyl, carboxyl, alkoxycarbonyl, alkylcarboxyl, alkoxyl, alklhydroxyl, aralkyl, alkenyl, alkylamide, alkylamino, alkylsufonamide, alkylcarbamoyl, alkylsulfamoyl, hydroxyl, halogen atom, hydrogen atom, alkylalkoxyl, alkylhalide, alkylsulfonyl, alkylcarboxyl or alkylsulfonyl which are bonded to a metallic ion or alkyl, phenyl, benzyl, alkylphenyl or phenoxyalkyl group. "p" represents the number of substituent groups, which is an integral of 1 or more.

"$R_5$" and "R6" may be the same or different from each other and are individually the substituted or unsubstitued alkyl, phenyl, benzyl, alkylphenyl or phenoxyalkyl group. "Z" is hydrogen atom, halogen atom or alkyl group, and "X−" is an anion selected from the group consisting of F−, Cl−, Br−, I−, $ClO_4^-$, $BF_4^-$, $PF_6^-$, $SbF_6^-$, OTs−, OMs−, SCN−, alkylsulfonate, and akylcarboxylate.

The material used in the dye layer could also comprise at least one trimethine-cyanine dye with electron-donating substituted group (EDG), and depicted in the following general formulas [10], [11], [12], and [13]. The dye layer comprising not only the trimethine-cyanine dye containing "EWG" but also the trimethine-cyanine dye containing "EDG" has the advantage of increasing the recording sensitivity, so that the writing power of laser can be reduced while recording information in DVD-R.

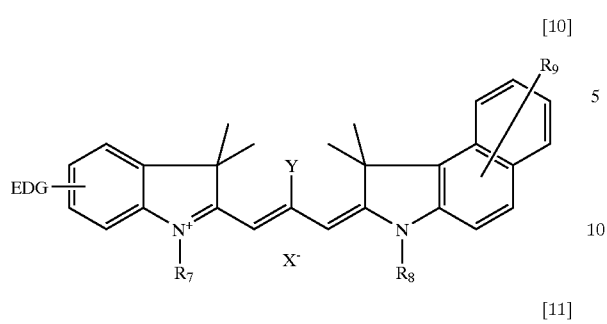

[10]

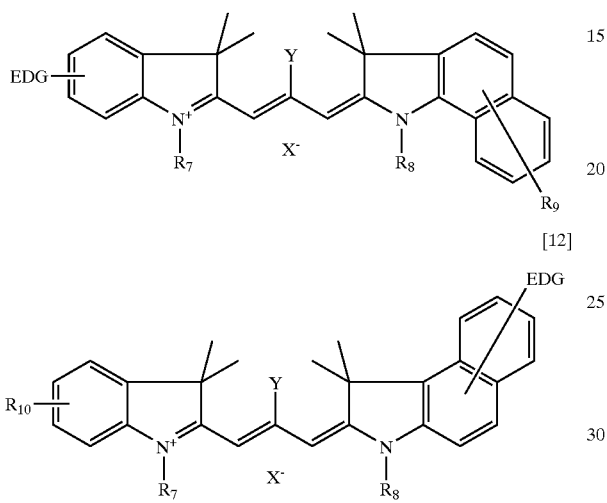

[11]

[12]

[13]

For example, "EDG" is an amino group, while "$R_3$" and "Y" of the formula [1] are hydrogen groups, as shown in the formula [10]. By the reduction of the nitro constituent in the formula [1] with reductant, such as $SnCl_2$, $H_2O$, Fe/HCl, formula [10] was obtained, as depicted in Scheme 3. It is noted that "$R_1$" and "$R_2$" of formula [10] in Scheme 3 are in the same position as "$R_7$" and "$R_8$".

Scheme 3

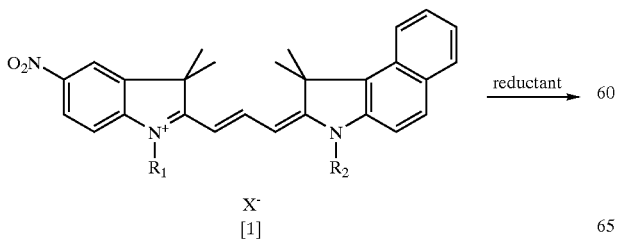

[1]

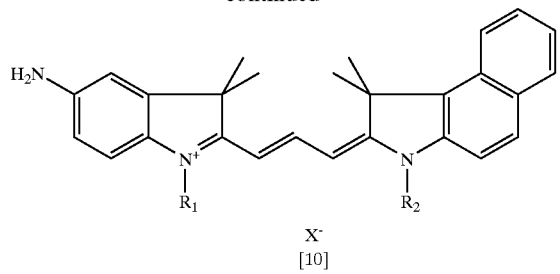

[10]

Examples of the compounds of the formula [10], which are synthesized by the similar method in table 2, are given below.

TABLE 2

[10]

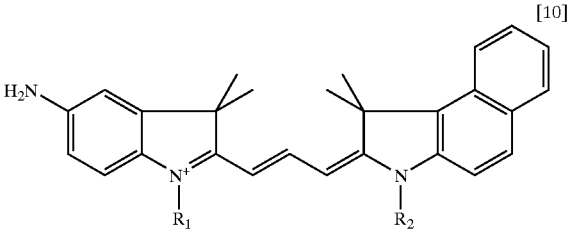

| Compound No | $R_1$ | $R_2$ | X |
|---|---|---|---|
| 10-1 | Me | Me | $ClO_4$ |
| 10-2 | Me | Bu | $ClO_4$ |
| 10-3 | Pr | Bu | $ClO_4$ |
| 10-4 | Bu | Bu | $ClO_4$ |
| 10-5 | Me | Me | $BF_4$ |
| 10-6 | Me | Bu | $BF_4$ |
| 10-7 | Pr | Bu | $BF_4$ |
| 10-8 | Bu | Bu | $BF_4$ |
| 10-9 | Me | Me | $PF_6$ |
| 10-10 | Me | Bu | $PF_6$ |
| 10-11 | Pr | Bu | $PF_6$ |
| 10-12 | Bu | Bu | $PF_6$ |
| 10-13 | Me | Me | $SbF_6$ |
| 10-14 | Me | Bu | $SbF_6$ |
| 10-15 | Pr | Bu | $SbF_6$ |
| 10-16 | Bu | Bu | $SbF_6$ |

In another example, "EDG" is a substituted alkylamino group, while "$R_3$" and "Y" (of formula [1]) are hydrogen groups in the formula [10]. By alkylating the amino constituent in the formula [10] with alkyl halide, an alkylamino substituted compound in formula [10] was obtained, as shown in Scheme 4.

Scheme 4

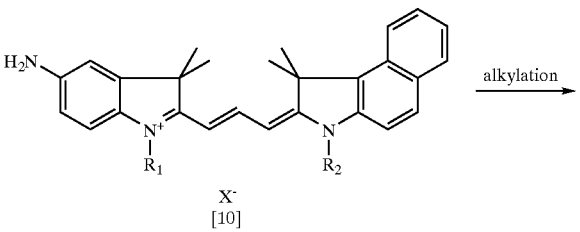

[10]

-continued

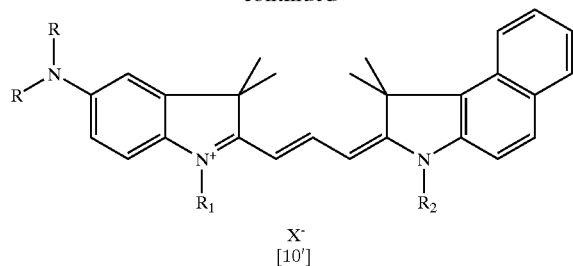

X⁻
[10']

Examples of the compounds of the formula of [10'], which are synthesized by the similar method in scheme 4, are given in Table 3.

TABLE 3

[10']

| Compound No | $R_1$ | $R_2$ | $R_{11}$ | $R_{12}$ | X |
|---|---|---|---|---|---|
| 10'-1 | Me | Me | Me | H | $ClO_4$ |
| 10'-2 | Me | Bu | Bu | H | $ClO_4$ |
| 10'-3 | Pr | Bu | Pr | H | $ClO_4$ |
| 10'-4 | Bu | Bu | Pr | Pr | $ClO_4$ |
| 10'-5 | Me | Me | Me | Me | $BF_4$ |
| 10'-6 | Me | Bu | Bu | Bu | $BF_4$ |
| 10'-7 | Pr | Bu | Bu | Bu | $BF_4$ |
| 10'-8 | Bu | Bu | Bu | Bu | $BF_4$ |
| 10'-9 | Me | Me | Me | Me | $PF_6$ |
| 10'-10 | Me | Bu | Bu | Bu | $PF_6$ |
| 10'-11 | Pr | Bu | Pr | Pr | $PF_6$ |
| 10'-12 | Bu | Bu | Pr | Pr | $PF_6$ |
| 10'-13 | Me | Me | Me | Me | $SbF_6$ |
| 10'-14 | Me | Bu | Bu | Bu | $SbF_6$ |
| 10'-15 | Pr | Bu | Pr | Pr | $SbF_6$ |
| 10'-16 | Bu | Bu | Pr | Pr | $SbF_6$ |

DVD-R Formation

A polycarbonate substrate is provided with a track pitch 0.74 μm and only wobble signal (pre-pit may also be included) is employed.

The dye solution can be prepared according to one of the following method:

(1) a cyanine dye represented by general formula [1], [2], [3], or [4] was dissolved in an organic solvent;
(2) a dye mixture, which contains cyanine dye represented by general formula [1], [2], [3], or [4] mixed with the dye of formula [5] that is less than 100% by weight, was dissolved in an organic solvent;
(3) a dye mixture, which contains cyanine dye represented by general formula [1], [2], [3], or [4] mixed with the dye of formula [10], [11], [12] or [13] that is less than 50% by weight, was dissolved in an organic solvent;
(4) a dye mixture, which contains cyanine dye-represented by general formula [5] mixed with the dye of formula [10], [11], [12] or [13] that is less than 50% by weight, was dissolved in an organic solvent; and
(5) a dye mixture, which contains cyanine dye represented by [1], [2], [3], [4] mixed with the dye of formula [5] that is less than 100% and the dye of formula [10], [11], [12] or [13] that is less than 50% by weight, was dissolved in an organic solvent.

The organic solvent is selected from the group consisting of fluorinated alcohol, diaceton alcohol, methylethyl ketone, methanol, toluene, cyclohexanone, acetylacetone and dioxane. Also, the concentration of the dye solution was in the range from about 0.5% to 20% by weight.

The dye solution according to the above description might further comprise some kinds of singlet oxygen quencher, such as a metal complex, a light absorbent, a radical scavenger, etc. Then, the substrate is spin-coated with the dye solution at a rotational frequency of 3000 rpm, and then is dried at 70° for 20 minutes to form a recording layer consisting of a photosensitive dye film with a thickness of 100 nm, approximately.

The material for the substrate may be employed by glass, epoxy resin, methacrylate resin, polycarbonate, polyester resin, polyvinyl chloride resin, or polyolefin resin. Also, the substrate may be provided with tracking grooves or pits.

Thereafter, a reflection layer is deposited on the recording layer by sputtering. The reflection layer, a metal film with high reflectivity such as Gold, Aluminum, Silver, Cupper, Platinum, and alloy, can be formed by the vapor-deposition or sputtering. Also, the reflection layer could be the multi-reflective layer.

A protective layer comprising an ultraviolet-curing resin is further spin-coated on the reflection layer. The protective layer is formed for the purpose of protecting or improving the optical recording medium, and can be formed by coating a solution of a radiation cure type resin on a given surface and then by radiation-curing the coater layer.

Then a pair of the optical discs thus obtained is superimposed via an adhesive layer comprising an ultraviolet-curing resin, and thereby a laminated-disc is obtained.

It is noted that the optical recording medium could be a single-sided recording medium obtained by laminating a single-side substrate and a non-grooved substrate with an adhesion, or could be a double-sided recording medium obtained by laminating two single-sided optical recording medium with an adhesion.

Next, a laser beam of 650 nm or further is irradiated to the optical discs to form the recording signals with improved characteristics, such as modulation amplitude, jitter and wide power margin.

This invention will be further explained in detail with reference to the following examples.

Dye Synthesis Process

First, to synthesize

N-propyl-2-(2-anilidovinyl)-3,3-dimethyl-5-nitroindolinium chlorate [17-1],

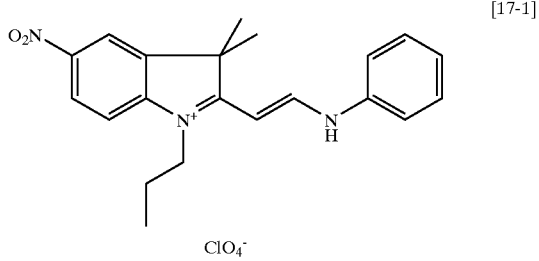

1-propyl-2,3,3-trimethyl-5-nitroindoleninum chlorate (23 g), N,N-diphenylformamidine (20g) and 1-octanol (70 mL) are mixed in a 500 mL round bottle with a condenser. The mixture is refluxed for 24 hr. The formula [17-1] (15 g) is obtained as a brown color crystal while the room temperature is reached. The $^1$H NMR spectrum is measured by the machine of 300 MHz. The result is: δ 1.04 (t, J=7.4 Hz, 3H), 1.85 (s, 6H), 4.15 (t, J=7.4 Hz, 2H), 6.30 (d, J=12.1 Hz, 1H), 7.40 (t, J=7.2 Hz, 1H), 7.53–766 (m, 4H), 7.79 (d, J=8.85 Hz, 1H), 8.40 (dd, J=12.1, 2.3 Hz, 1H), 8.68 (d, J=2.3 Hz, 1H) and 8.88 (d, J=12.1 Hz, 1H).

Second, the compound of formula [17-1] (12 g), 1-butyl-2,3,3-trimethylbenzo(e) indoleninium chlorate (9 g) and Pyridine (20 mL) are mixed by stirring at room temperature for 3 hr. Then, the solution is poured into 10% $H_2SO_4$ solution. The formula [1-19] (15 g) is obtained by filtering and crystallizing with MeOH. The spectrum result is $\lambda_{max}$ (TFP)=577 nm; $^1$H NMR (300 MHz, CDCl$_3$) δ 0.99 (t, J=7.2 Hz, 3H), 1.06 (t, J=7.2 Hz, 3H), 1.53–1.61 (m, 4H), 1.78 (s, 6H), 1.92 (quin., J=7.2 Hz, 3H), 2.03 (s, 6H), 4.10 (t, J=7.2 Hz, 3H), 4.42 (t, J=7.2 Hz, 3H), 6.89 (d, J=13.5 Hz, 1H), 7.07 (d, J=8.8 Hz, 1H), 7.13 (d, J=13.5 Hz, 1H), 7.47 (d, J=8.8 Hz, 1H), 7.54 (t, J=7.6 Hz, 1H), 7.66 (t, J=7.6 Hz, 1H), 7.97–8.02 (m, 1H), 8.13 (d, J=8.6 Hz, 1H), 8.16 (d, J=2.1 Hz, 1H), 8.29 (dd, J=8.6, 2.1 Hz, 1 H), 8.51 (t, J=13.5 Hz, 1H).

Third, the compound of formula [1-19] (5.7 g), Tin chloride dihydrate (10.5 g) were dissolved in EtOH (40 mL), then the mixture was heated under refluxing for 6 hr. After cooling down to room temperature, the solution was poured into 10% NaOH solution. The formula [10-3] (4.5 g) is obtained by filtering and crystallizing with MeOH. The spectrum result is $\lambda_{max}$ (TFP)=576 nm; $^1$H NMR (300 MHz, CDCl$_3$) δ 0.95–1.02 (m, 6H), 1.46–1.58 (m, 4H), 1.73 (s, 6H), 1.76–1.90 (m, 4H), 2.01 (s, 6H), 4.07 (t, J=7.4 Hz, 2H), 4.15 (t, J=7.4 Hz, 2H), 6.38–6.47 (m, 2H), 6.69 (dd, J=2.2, 8.4 Hz, 1H), 6.90–6.93 (m, 2H), 7.28–7.34 (m, 1H), 7.40–7.47 (m, 1H), 7.6 (t, J=11 Hz, 1H), 7.94 (d, J=8.9 Hz, 2H), 8.10 (d, J=8.9 Hz, 1H), 8.42 (t, J=13.5 Hz, 1H).

Fourth, the compound of formula [10-3] (5.7 g), n-Propyl Iodide (3.3 g) were dissolved in Ethyl Acetate (20 mL), then the mixture was heated under reflux for 24 hr. After cooling down to room temperature, the solution was poured into 10% NaOH solution. The formula [10'-3] (4.0 g) is obtained by filtering and crystallizing with MeOH. The spectrum result is $\lambda_{max}$ (TFP)=580 nm; $^1$H NMR (300 MHz, CDCl$_3$) δ 0.98–1.13 (m, 12H), 1.50–1.63 (m, 2H), 1.74 (s, 6H), 1.84–1.96 (m, 4H), 2.0 (s, 6H), 3.03–3.16 (m, 2H), 3.88–4.21 (m, 4H), 6.57–6.76 (m, 4H), 6.98 (d, J=8.5 Hz, 1H), 7.33 (d, J=8.8 Hz, 1H), 7.44 (t, J=7.5 Hz, 1H), 7.59 (t, J=7.5 Hz, 1H), 7.92 (dd, J=4.0, 8.0 Hz, 2H), 8.10 (d, J=8.5Hz, 1H), 8.41 (t, J=13.5 Hz, 1H).

Disc Test 1

There are five experiments, Examples 1, 2, 3 and Comparative Examples 1, 2, conducted in Disc Test 1, and the results are summarized in Table 4. The experimental details are described as follows.

TABLE 4

| Example | UV Spectrum (nm) (TFP) | Write (650 nm) | Reflectance % | Push-Pull % | I14/ I14H | Jitter % |
| --- | --- | --- | --- | --- | --- | --- |
| 1 | 577 | OK | 66.4 | 0.29 | 0.45 | 8.2 |
| 2 | 577 | OK | 55.3 | 0.60 | 0.60 | 5.7 |
| 3 | 577 | OK | 47.5 | 0.43 | 0.61 | 6.5 |
| Comparative 1 | 566 | Not available | | | | |
| Comparative 2 | 568 | Not available | | | | |

EXAMPLE 1

A transparent substrate, which is a disc made of a polycarbonate resin and has a spiral pre-groove with track pitch 0.74 μm thereon, is provided. The outer diameter of the substrate is about 120 mm and the thickness is about 0.6 mm.

Then, compound [1-19] (5.0 g) is dissolved in 100 mL of TFP (2,2,3,3-tetrafluoro-1-propanol) by stirring for 5 hrs at room temperature. The resulting solution is filtered through PTFE (0.2 μm) membrane filter to prepare a dye solution.

Next, the substrate is spin-coated with the dye solution at a rotational frequency of 3000 rpm, and dried at 70° for 20 minutes to form a recording layer consisting of a photosensitive dye film with a film thickness of 100 nm.

Afterwards, Ag is sputtered on this recording layer to form a reflective layer with a thickness of 100 nm. Argon gas is used as the sputtering gas. The sputtering power is 1.5 kW and the sputtering pressure is $1.0 \times 10^{-2}$ Torr.

Furthermore, an ultraviolet-curing resin (No.575 made by Nippon Chemicals, Inc.) is dripped on the reflective film. Another substrate, which is molded in the same manner as mentioned above, is placed on the surface of the substrate with the ultraviolet-curing resin thereon. After the resin interposed between these two substrates is dispersed by spin-coating method, the ultraviolet-curing resin is cured by irradiating ultraviolet. An optical laminated-disc is obtained by forming adhesive region of 25 μm in thickness and 32 mm to 120 mm in diameter.

Finally, a recording is performed on this optical disc by the recording machine of DVD-R/RW A03, PIONEER. The machines of DVDT-2R, DVD-R/RW TESTER, DVDT-2R650 for general, EXPERT MAGNETICS Co., Ltd. are used to measure the reflectance, push-pull, jitter and modulation amplitude. The measurement results are shown in Table 1.

EXAMPLE 2

An optical recording disc is manufactured in the same manner as described in example 1, except the dye material is replaced by compound of formula [1-21]. The optical parameters of the recording layer are measured in the same manner as illustrated in example 1, and the results of measurements are also shown in Table 4. It is indicated that the reflectance, push-pull and modulated amplitude of example 2 are high, but the jitter is low.

EXAMPLE 3

An optical recording disc is manufactured in the same manner as described in example 1, except the dye material is replaced by the compound of formula [1-22]. The optical parameters of the recording layer are measured in the same manner as illustrated in example 1, and measurement results are shown in Table 4.

COMPARATIVE EXAMPLE 1

An optical recording disc is manufactured in the same manner as described in example 1 except the dye material is replaced by the compound of formula [19]. The optical parameters of the recording layer are measured in the same manner as illustrated in example 1, and the results of measurements are also shown in Table 4.

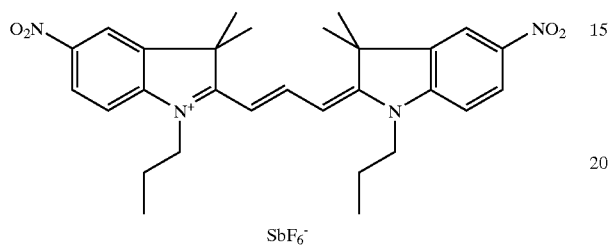

[19]

SbF$_6^-$

The result indicated that the optical recording disc of comparative example 1 is not acceptable by the DVD-R machine with the writing wavelength of 650 nm.

COMPARATIVE EXAMPLE 2

An optical recording disc is manufactured in the same manner as described in example 1, except the dye material is replaced by the compound of formula [20]. The optical parameters of the recording layer are measured in the same manner as illustrated in example 1, and the results of measurements are shown in Table 4.

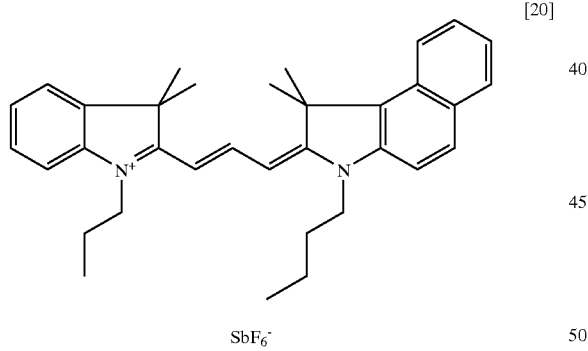

[20]

SbF$_6^-$

The results also indicated that the optical recording disc of comparative example 2 is not available by using the DVD-R machine with the writing wavelength of 650 nm.

From the above description, the recording layer comprising only one kind of trimethine-cyanine dye with the asymmetric substituted structures of electron-withdrawing group (Example 1 to 3) is much more suitable than that comprising trimethine-cyanine dye with symmetrical structure (comparative example 1), or the asymmetric one without electron-withdrawing group (comparative example 2) while the wavelength of laser beam 650 nm is used in the recorder.

Disc Test 2

There are seven experiments, Examples 4,5,6,7 and Comparative Examples 3,4,5, conducted in Disc Test 2, and the results are summarized in Table 5. The experimental details are described as follows.

TABLE 5

| Example | Write (650 nm) | Reflectance % | Push-Pull % | I14/I14H | Jitter % |
|---|---|---|---|---|---|
| 4 | OK | 57.6 | 0.34 | 0.6 | 7.4 |
| 5 | OK | 56.3 | 0.34 | 0.6 | 6.7 |
| 6 | OK | 64.9 | 0.30 | 0.58 | 7.5 |
| 7 | OK | 48.6 | 0.45 | 0.62 | 7.1 |
| Comparative 3 | Not available | | | | |
| Comparative 4 | Not available | | | | |
| Comparative 5 | Not available | | | | |

EXAMPLE 4

First, a transparent substrate, which is a disc made of a polycarbonate resin and has a spiral pre-groove with track pitch 0.74 μm thereon, is provided. The outer diameter of the substrate is about 120 mm and the thickness is about 0.6 mm.

Compounds of formula [1-21] (3.0 g) and formula [21] (0.6 g) descended from the formula [5] are dissolved in TFP (2,2,3,3-tetrafluoro-1-propanol) (50 mL) by stirring for 5 hrs at room temperature. The resulting solution is filtered through PTFE (0.2 μm) membrane filter to prepare a dye solution.

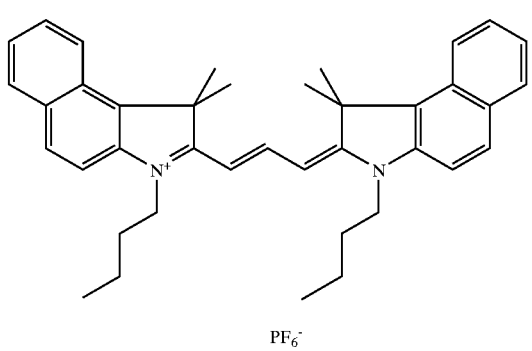

[21]

PF$_6^-$

This substrate is spin-coated with the dye solution at a rotational frequency of 3000 rpm, and then dried at 70° for 20 minutes to form a recording layer comprising a photosensitive dye film with a film thickness of 100 nm.

Next, Ag is sputtered on this recording layer to form a reflective layer with a thickness of 100 nm. An argon gas is used as sputtering gas. The sputtering power is 1.5 kW and the sputtering pressure is $1.0 \times 10^{-2}$ Torr.

Furthermore, an ultraviolet-curing resin (No.575 made by Nippon Chemicals, Inc.) is dripped on the reflective film. Another substrate, which is molded in the same manner as mentioned above, is placed on the surface of the substrate with the ultraviolet-curing resin thereon. After the resin interposed between these two substrates is dispersed by spin-coating method, the ultraviolet-curing resin is cured by irradiating ultraviolet rays. Consequently, an adhesive region of 25 μm in thickness and 32 mm to 120 mm in diameter are formed, and a laminated-disc type optical disc is obtained.

Finally, a recording is performed on this optical disc by a recording machine of DVD-R/RW A03, PIONEER. The machines of DVDT-2R, DVD-R/RW TESTER, DVDT-2R650 for general, EXPERT MAGNETICS Co., Ltd. are used to measure the reflectance, push-pull, jitter and modulation amplitude. The results of measurements are shown in Table 5.

EXAMPLE 5

An optical recording disc is manufactured in the same manner as described in example 4; however, the dye material is replaced by the mixture of compounds including formula [1-22] (2.0 g) and formula [21] (0.4 g) descended from the general formula [5]. The optical parameters of the recording layer are measured in the same manner as illustrated in example 4, and the results of measurements are shown in Table 5.

EXAMPLE 6

An optical recording disc is manufactured in the same manner as described in example 4, except the dye material is replaced by the mixture of formula [1-23] (2.0 g) and formula [21] (0.9 g) descended from the general formula [5]. The optical parameters of the recording layer are measured in the same manner as illustrated in example 4, the results of measurements are shown in Table 5.

EXAMPLE 7

An optical recording disc is manufactured in the same manner as described in example 4, except the dye material is replaced by the mixture of formula [1-16] (2.0 g) and formula [21] (0.2 g) descended from the general formula [5]. The optical parameters of the recording layer are measured in the same manner as illustrated in example 4, and the results of measurements are shown in Table 5.

COMPARATIVE EXAMPLE 3

An optical recording disc is manufactured in the same manner as described in example 4, except the dye material is replaced by the mixture of formula [22] (2.0 g) and formula [21] (0.2 g) descended from the general formula [5]. The optical parameters of the recording layer are measured in the same manner as illustrated in example 4, and the results of measurements are shown in Table 5.

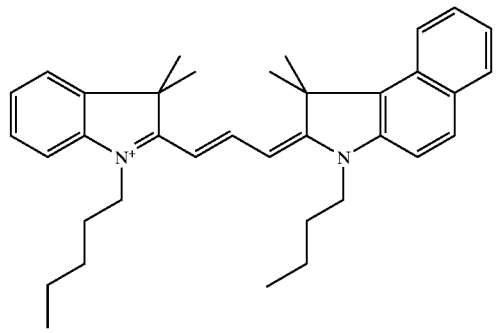

[22]

ClO$_4^-$

In this comparative example, the result indicated that the data cannot be recorded on the disc by using the DVD-R machine with the writing wavelength of 650 nm. But it is performed well while the writing wavelength is 635 nm.

COMPARATIVE EXAMPLE 4

An optical recording disc is manufactured in the same manner as described in example 4, except that dye material is replaced with the mixture of formula [23] (2.0 g) and formula [21] (0.2 g) descended from formula [5]. The optical parameters of the recording layer are measured in the same manner as illustrated in example 4, and the results of measurements are shown in Table 5.

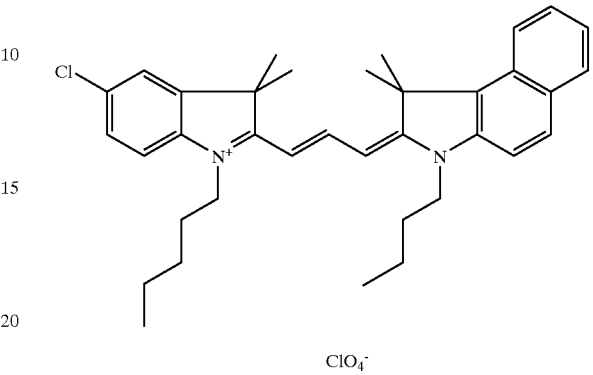

[23]

ClO$_4^-$

In this comparative example, the result indicated that the recording can't be performed by using the DVD-R machine with the writing wavelength of 650 nm. However, it is performed well while the writing wavelength is 635 nm.

COMPARATIVE EXAMPLE 5

An optical recording disc is manufactured in the same manner as described in example 4, except that dye material is replaced with the mixture of formula [24] (2.0 g) and formula [21] (0.2 g) descended from formula [5] are used. The optical parameters of the recording layer are measured in the same manner as illustrated in example 4, and the results of measurements are shown in Table 5.

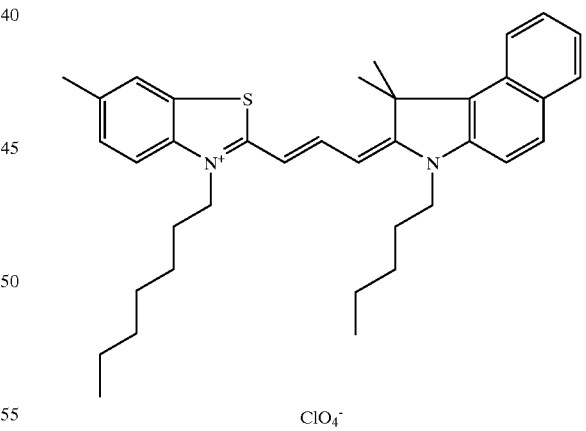

[24]

ClO$_4^-$

In this comparative example, the result indicated that the recording cannot be performed by using the DVD-R machine with the writing wavelength of 650 nm. But it is performed well while the writing wavelength is 635 nm.

From the above description, the satisfied results of Example 4 to Example 7 are presented, while the wavelength of laser beam 650 nm is used in the recorder. In Example 4 to Example 7, the recording layer comprising two kinds of trimethine-cyanine dyes, and one of the dye materials is required to be the asymmetric substituted structures of electron-withdrawing group. If the dye materials with the asymmetric substituted structures of electron-withdrawing group is changed to the trimethine-cyanine dyes with substituted group other than the asymmetric substituted structures of electron-withdrawing group, like hydrogen of comparative example 3, chlorine of comparative example 4 and methyl group of comparative example 5, the recording results will be failed for the corresponding discs.

Furthermore, using the trimethine-cyanine dye material with the asymmetric substituted structure of electron-withdrawing group gets high push-pull, low jitter, large modulated amplitude and high reflectance. IF the jitter value is low, the heat on the optical disc will be accumulated uneasily. Also, the large modulated amplitude combined with low jitter makes the optical disc have good sensitivity of reproducing. It is apparently that the dye material with the asymmetric substituted structure of electron-withdrawing group improves the recording properties a lot, while the 635 nm laser wavelength is used during the recording process.

Disc Test 3

There are five experiments, Examples 4, 8, 9, 10 and Comparative Example 6, conducted in Disc Test 3, and the results are summarized in Table 6. Example 4 has been illustrated in the Disc Test 2. The other experiments are described in detail as follows.

TABLE 6

| Sample No | Po (mW) | Reflectance (%) | I14/I14H | Jitter |
|---|---|---|---|---|
| 4 | 11.4 | 57.6 | 0.6 | 7.4 |
| 8 | 10.3 | 54.1 | 0.646 | 6.7 |
| 9 | 9.8 | 53.8 | 0.6 | 7.5 |
| 10 | 10.1 | 50.8 | 0.61 | 7.8 |
| Comparative 6 | Not Available | | | |

EXAMPLE 8

An optical recording disc is manufactured in the same manner as described in example 4, except the dye material is replaced by the mixture of compounds of formula [1-22] (0.7 g) and formula [21] (0.3 g) descended from the general formula [5]. The optical parameters of the recording layer are measured ion the same manner as illustrated in example 4, and the results of measurements are shown in Table 6.

EXAMPLE 9

An optical recording disc is manufactured in the same manner as described in example 4, except the dye material is replaced by the mixture of formula [1-22] (0.3 g), formula [21] (0.7 g) descended from the general formula [5], and formula [10'-16] (0.05 g) descended from the general formula [10]. The optical parameters of the recording layer are measured in the same manner as illustrated in example 4, and the results of measurements are shown in Table 6.

EXAMPLE 10

An optical recording disc is manufactured in the same manner as described in example 4, except the dye material is replaced by the mixture of formula [1-22] (0.9 g) and formula [10'-16] (0.06 g) descended from the general formula [10]. The optical parameters of the recording layer are measured in the same manner as illustrated in example 4, and the results of measurements are shown in Table 6.

COMPARATIVE EXAMPLE 6

An optical recording disc is manufactured in the same manner as described in example 4, except the dye material is replaced by formula [10'-16] (0.9 g) descended from the general formula [10]. The optical parameters of the recording layer are measured in the same manner as illustrated in example 4, and the results of measurements are also shown in Table 3.

According to the result, formula [10] could reduce recording write power, but the content of the dye composition should be lower than 50%. If formula [10] is the only component used in the dye layer, the sensitivity might be too high to maintain the disc at good reflectivity. That might cause fail recording.

While the invention has been described by way of examples and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical recording medium provided on a substrate with a recording layer, said recording layer comprising at least one kind of the trimethine-cyanine dye and an additive, wherein said the additive of recording layer selectively comprises the dye selected from the group consisting of the chemical compounds represented by the following general formula [10], [11], [12], and [13]:

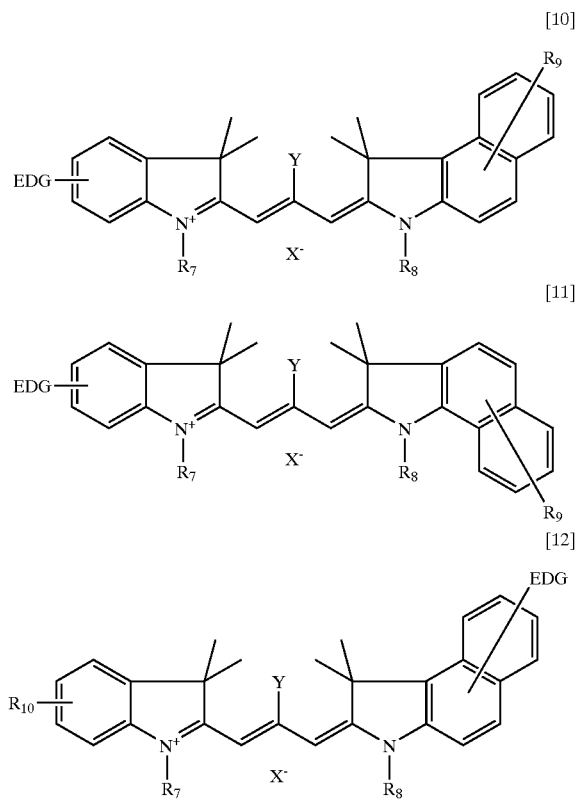

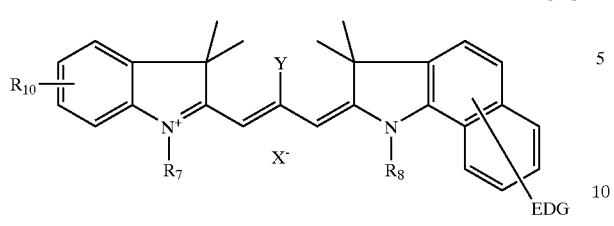

wherein "EDG" represents an electron-donating substituted group; "$R_7$" and "$R_8$" are independently selected from substituted or unsubstitued alkyl, phenyl, benzyl, alkylphenyl or phenoxyalkyl group; "$R_9$" and "$R_{10}$" are independently selected from hydrogen atom, halogen atom, cyano or nitro group; "Y" is hydrogen atom, halogen atom or alkyl group; and "X" is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, $SCN^-$, alkylsulfonate and alkylcarboxylate.

2. The optical recording medium of claim 1, wherein the ratio of formula of [10], [11], [12], and [13] in dye component is less than 50% by weight.

3. The optical recording medium of claim 1, wherein "EDG" is an amino group.

4. The optical recording medium of claim 1, wherein "EDG" is an alkylamino group.

5. The optical recording medium of claim 1, wherein "EDG" is a methoxy group.

6. The optical recording medium of claim 1, wherein said that trimethine-cyanine dye is selected from the group consisting of the chemical compounds represented by the following general formulas [1], [2], [3], and [4]:

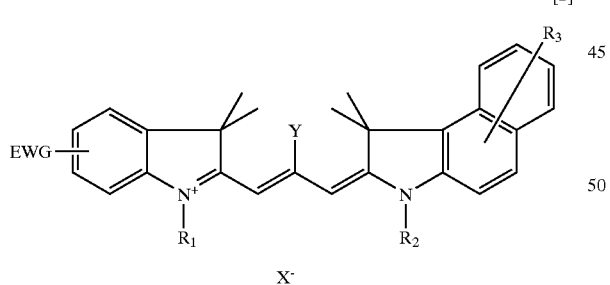

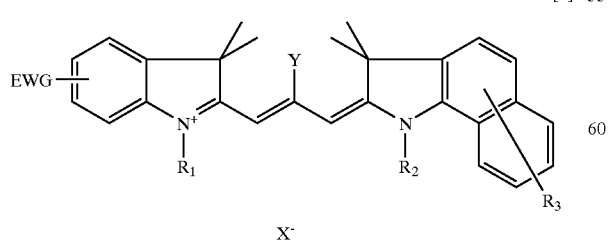

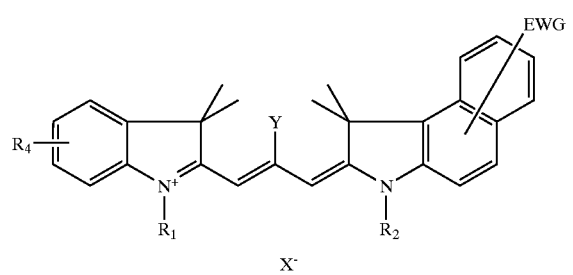

wherein "EWG" represents an electron-withdrawing substituted group; "$R_1$" and "$R_2$" are independently selected from substituted or unsubstitued alkyl, phenyl, benzyl, alkylphenyl or phenoxyalkyl group; "$R_3$" and "$R_4$" are independently selected from hydrogen atom, halogen atom, alkoxy, hydroxyl, or alkyl group; "Y" is selected from hydrogen atom, halogen atom or alkyl group; and "X" is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, $SCN^-$, alkylsulfonate, and akylcarboxylate.

7. The optical recording medium of claim 6, wherein "EWG" is a nitro group.

8. The optical recording medium of claim 6, wherein "EWG" is a cyano group.

9. The optical recording medium of claim 1, wherein said recording layer selectively contains the dye represented by the following general formula [5],

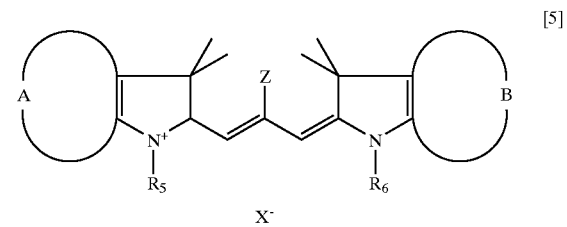

"A" and "B" are independently selected from any one of the following general formulas [6], [7], [8], and [9];

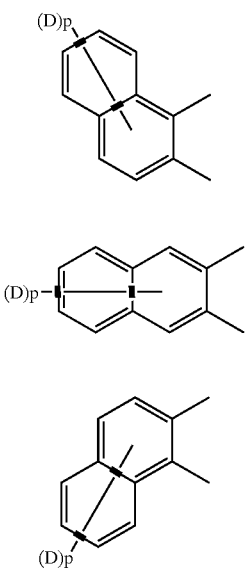

"D" is selected from substituted or unsubstitued alkyl, carboxyl, alkoxycarbonyl, alkylcarboxyl, alkoxyl, alklhydroxyl, aralkyl, alkenyl, alkylamide, alkylamino, alkylsufonamide, alkylcarbamoyl, alkylsulfamoyl, hydroxyl, halogen atom, hydrogen atom, alkylalkoxyl, alkylhalide, alkylsulfonyl, alkylcarboxyl or alkylsulfonyl which are bonded to a metallic ion or alkyl, phenyl, benzyl, alkylphenyl or phenoxyalkyl group; "p" represents the number of substituent groups, which is an integer of 1 or more; "$R_5$" and "$R_6$" are independently selected from substituted or unsubstitued alkyl, phenyl, benzyl, alkylphenyl or phenoxyalkyl group; "Z" is hydrogen atom, halogen atom or alkyl group; and "X" is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, SCN, alkylsulfonate, and akylcarboxylate.

10. An optical recording medium provided on a substrate with a recording layer, said recording layer comprising at least one kind of the trimethine-cyanine dye containing an electron-withdrawing substituted group (EWG), and selected from the group consisting of the chemical compounds represented by the following general formulas [1], [2], [3], and [4]; and

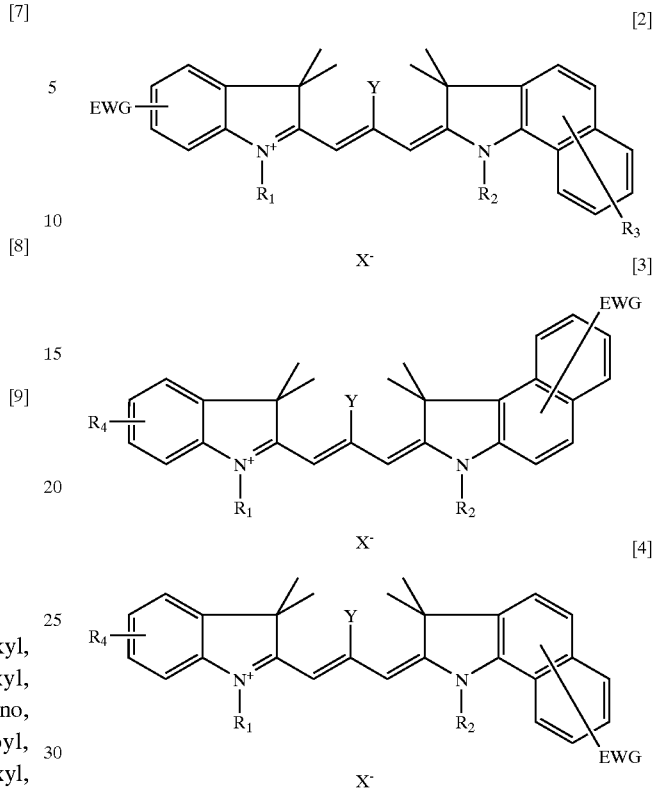

at least one kind of the trimethine-cyanine dye containing an electron-donating substituted group (EDG), and selected from the group consisting of the chemical compounds represented by the following general formulas [10], [11], [12], and [13];

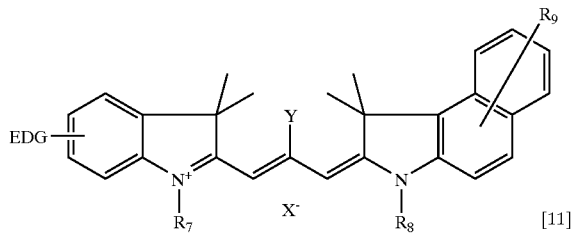

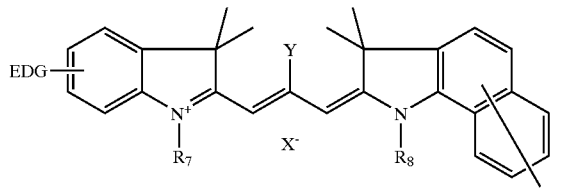

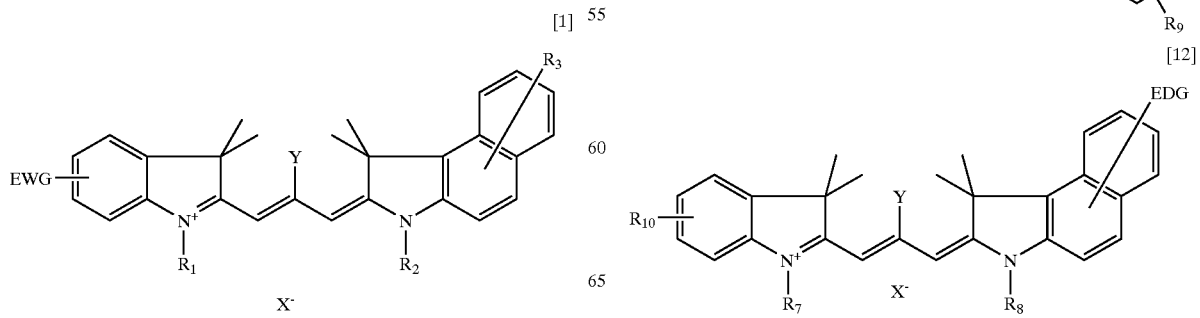

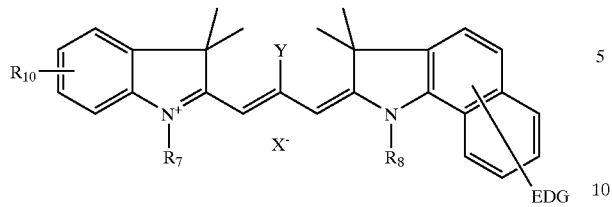

[13]

wherein "$R_1$", "$R_2$", "$R_7$" and "$R_8$" are independently selected from substituted or unsubstitued alkyl, phenyl, benzyl, alkylphenyl or phenoxyalkyl group; "$R_3$", "$R_4$", "$R_9$" and "$R_{10}$" are independently selected from hydrogen atom, halogen atom, alkoxy, hydroxyl, or alkyl group; "Y" is selected from hydrogen atom, halogen atom or alkyl group; and "X" is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, $SCN^-$, alkylsulfonate and akylcarboxylate.

* * * * *